(12) United States Patent
Gehrke (10) Patent No.: US 8,991,358 B2
(45) Date of Patent: Mar. 31, 2015

(54) REACTIVITY CONTROLLED COMPRESSION IGNITION ENGINE WITH EXHAUST GAS RECIRCULATION

(75) Inventor: Christopher R. Gehrke, Chillicothe, IL (US)

(73) Assignee: Caterpillar Inc., Peoria, IL (US)

(*) Notice: Subject to any disclaimer, the term of this patent is extended or adjusted under 35 U.S.C. 154(b) by 266 days.

(21) Appl. No.: 13/559,812

(22) Filed: Jul. 27, 2012

(65) Prior Publication Data
US 2014/0026859 A1  Jan. 30, 2014

(51) Int. Cl.
F02M 43/00 (2006.01)
F02M 43/04 (2006.01)
F02B 3/00 (2006.01)

(52) U.S. Cl.
CPC .............. F02M 43/00 (2013.01); F02M 43/04 (2013.01)
USPC ..................................... 123/299; 123/568.21

(58) Field of Classification Search
CPC ........... F02M 43/00; F02M 43/04; F02B 3/00
USPC ................. 123/299, 300, 304, 305, 575–578, 123/568.21, 698; 701/103, 104, 105, 108
See application file for complete search history.

(56) References Cited

U.S. PATENT DOCUMENTS

| | | | |
|---|---|---|---|
| 6,619,274 B2 | 9/2003 | Miyashita et al. |
| 6,622,663 B2 | 9/2003 | Weissman et al. |
| 6,622,664 B2 | 9/2003 | Holder et al. |
| 6,655,130 B1 | 12/2003 | Kirwan et al. |
| 6,729,301 B2 | 5/2004 | Nakamori et al. |
| 6,845,608 B2 | 1/2005 | Klenk et al. |
| 6,959,693 B2 | 11/2005 | Oda |
| 7,007,669 B1 | 3/2006 | Willi et al. |

(Continued)

FOREIGN PATENT DOCUMENTS

| | | |
|---|---|---|
| EP | 0945606 A2 | 9/1999 |
| EP | 2415997 A1 | 2/2012 |

(Continued)

OTHER PUBLICATIONS

Lienert, Anita, "Chrysler, Feds Developing Experimental Gasoline-Diesel Engine," *Edmunds Inside Line*, Jun. 7, 2011, downloaded from http://www.insideline.com/chrysler/chrysler-feds-developing-experimental-gasoline-diesel-engine.html on Jun. 21, 2012, 4 pp.

(Continued)

*Primary Examiner* — Mahmoud Gimie
(74) *Attorney, Agent, or Firm* — Leydig, Voit & Mayer, Ltd.

(57) ABSTRACT

An internal combustion engine is configured to utilize a reactivity controlled compression ignition process and an exhaust gas recirculation ("EGR") system. The EGR system directs a portion of the exhaust gasses from the exhaust system to the air intake system. The engine system is adapted to introduce a first fuel charge having a first reactivity to a combustion chamber at a first time during the intake-compression cycle of the engine. The engine system is also adapted to introduce a second fuel charge having a second reactivity at a second time during the intake-compression cycle to generate stratified regions of different reactivity in the combustion chamber. A controller operatively associated with the engine can monitor one or more operating parameters and can adjust either the EGR system and/or the second introduction of the second fuel charge based in part upon the operating parameter.

20 Claims, 4 Drawing Sheets

(56) References Cited

U.S. PATENT DOCUMENTS

| | | | |
|---|---|---|---|
| 7,195,006 | B2 | 3/2007 | Khair et al. |
| 7,213,573 | B2 | 5/2007 | Daniels et al. |
| 7,231,906 | B1 | 6/2007 | Haskara et al. |
| 7,252,054 | B2 | 8/2007 | Weber et al. |
| 7,263,968 | B2 | 9/2007 | Cairns et al. |
| 7,293,409 | B2 | 11/2007 | Sellnau et al. |
| 7,597,072 | B2 | 10/2009 | Stein et al. |
| 7,690,336 | B2 | 4/2010 | Bowman et al. |
| 7,721,703 | B2 * | 5/2010 | Kakuho et al. ............... 123/304 |
| 8,042,516 | B2 | 10/2011 | Takahashi et al. |
| 2005/0252489 | A1 | 11/2005 | Moody |
| 2006/0180121 | A1 * | 8/2006 | Wickman et al. ............ 123/299 |
| 2007/0256648 | A1 | 11/2007 | Sun et al. |
| 2007/0289573 | A1 | 12/2007 | Leone et al. |
| 2008/0230041 | A1 | 9/2008 | Brusslar et al. |
| 2010/0198481 | A1 | 8/2010 | Bromberg et al. |
| 2011/0010074 | A1 * | 1/2011 | Hung et al. .................... 701/103 |
| 2011/0184629 | A1 | 7/2011 | Krengel et al. |
| 2011/0192367 | A1 | 8/2011 | Reitz et al. |

FOREIGN PATENT DOCUMENTS

| | | |
|---|---|---|
| JP | 07-103049 A | 4/1995 |
| JP | 2005-098132 A | 4/2005 |
| JP | 2009-191734 A | 8/2009 |
| KR | 10-2012-0049620 A | 5/2012 |
| WO | WO 2010/075167 A1 | 1/2010 |

OTHER PUBLICATIONS

Splitter, Derek et al., "Deer 2011—Heavy Duty RCCI," Univ. of Wisconsin, Engine Research Center, Oct. 5, 2011, 13 pp.

* cited by examiner

REACTIVITY CONTROLLED COMPRESSION IGNITION ENGINE WITH EXHAUST GAS RECIRCULATION

TECHNICAL FIELD

This patent disclosure relates generally to internal combustion engines and, more particularly, to internal combustion engines that operate using more than one fuel.

BACKGROUND

Internal combustion engines operating with more than one fuel are known. Certain engines use two or more fuels having different reactivities. One example of such an engine can be seen in U.S. Patent Application Pub. No. 2011/0192367, which was published on Aug. 11, 2011 to Reitz et al. (hereafter, "Reitz") herein incorporated by reference in its entirety. Reitz describes a compression ignition engine that uses two or more fuel charges having two or more reactivities in a process that is sometimes referred to as reactivity controlled compression ignition ("RCCI"). According to Reitz, two fuels can be introduced into the combustion chamber at different times to produce stratified regions having different reactivities that will auto-ignite under compression. The relative reactivities of the fuels and timing of their introduction determines in part ignition timing, and duration and temperature of combustion that, in turn, can affect combustion rate, engine power output and emissions. In fact, the two-fuel methodology disclosed in Reitz is described as reducing engine emissions in accordance with government regulations without the assistance of other emission reduction technologies such as exhaust gas recirculation ("EGR").

EGR is a technology in which a portion of the exhaust gasses expelled from the combustion process are redirected and combined with the engine intake air to reduce emissions such as nitrogen oxides ($NO_X$). The presence of exhaust gasses in the combustion chamber at the start of combustion lowers the relative oxygen ratio and the maximum combustion temperature that otherwise promotes $NO_X$ formation. The dual reactivity system of Reitz and EGR therefore offer two different control parameters for reducing emissions. However, because of their different operational methodologies and characteristics, it has thus far not been understood whether or how they could work in conjunction with one another.

SUMMARY

The disclosure describes, in one aspect, an internal combustion engine system utilizing both a RCCI combustion process and an EGR system. The engine system includes a combustion chamber defining a variable volume delineated by a cylinder and a piston moving in the cylinder. The engine system further includes an intake manifold for directing intake air to the combustion chamber and an exhaust manifold for directing exhaust gasses from the combustion chamber. The engine system also includes an EGR system directing a portion of the exhaust gasses from the exhaust system to the intake system. To introduce a first fuel charge having a first reactivity at a first time and a second fuel charge having a second reactivity at a second time, respective first fuel injectors and second injectors are included. The engine system can also include a sensor monitoring an engine operating parameter and a controller communicating with the sensor. The controller further controls the EGR system and the second injector so as to adjust either the EGR system and/or the second injector in part upon the monitored operating parameter.

In another aspect, the disclosure describes a method of operating an internal combustion engine configured to utilize fuels having two different reactivities. The method includes mixing with an exhaust gas recirculation (EGR) system a portion of exhaust gasses with intake air to provide an intake air/exhaust gas mixture. The method introduces the intake air/exhaust gas mixture to a combustion chamber. The method also introduces into the combustion chamber at a first introduction time a first fuel charge having a first reactivity during an intake-compression cycle and subsequently introduces into the combustion chamber at a second introduction time a second fuel charge having a second reactivity. The first and second fuel charges are combusted in the combustion chamber. The method further monitors at least one engine operating parameter reflective of the combustion process and adjusts at least the EGR system or the second introducing step in response to the monitoring.

In a further aspect, the disclosure describes another method of adjusting combustion in an internal combustion engine. This method mixes intake air with exhaust gasses using an EGR system to produce an intake air/exhaust gas mixture having a mixing ratio. The intake air/exhaust gas mixture is introduced into a combustion chamber during an intake stroke as a piston moves in a cylinder from the top dead center (TDC) position to the bottom dead center (BCD) position. Also introduced to the combustion chamber at a first introduction time is a first fuel charge having a first reactivity so that the first fuel charge generally uniformly disperses within the combustion chamber. Subsequently introduced is a second fuel charge having a second reactivity so that the second fuel charge forms stratified regions within the combustion chamber. According to the method, the stratified regions of the second fuel charge are auto-ignited at an ignition time during a compression stroke as the piston moves from the BDC position to the TDC position and the first fuel charge and the intake air/exhaust gas mixture are subsequently combusted. The method then determines the ignition time by use of a sensor and adjusts one of the mixing ratio and the second introduction time based in part on the ignition time determination.

DETAILED DESCRIPTION

This disclosure relates to internal combustion engines and, more particularly, to internal combustion engines that operate using more than one fuel, for example, in an RCCI combustion process, and machines that include such engine systems. Internal combustion engines burn a hydrocarbon-based fuel or another combustible fuel source to convert the potential or chemical energy therein to mechanical energy in the form of physical motion that can be harnessed for other work. In one embodiment, the disclosed engine operates using a high reactivity fuel such as diesel in conjunction with a low reactivity fuel such as gasoline although alternative embodiments in which a single fuel that is processed so as to have two different reactivities or two other kinds of fuels are contemplated. In the various embodiments contemplated, fuels having different reactivities are introduced to an engine cylinder by various methods including direct injection of one or more fuels into the cylinder and/or indirect injection methods. Indirect fuel injection methods can be tailored to the particular type of fuel being used. For example, a gaseous fuel such as propane or natural gas can be dispersed into the intake manifold of the engine for mixing with engine intake air, while a liquid fuel such as gasoline can be injected at or close to a cylinder intake port for mixing with air entering the cylinder.

Figure 1:
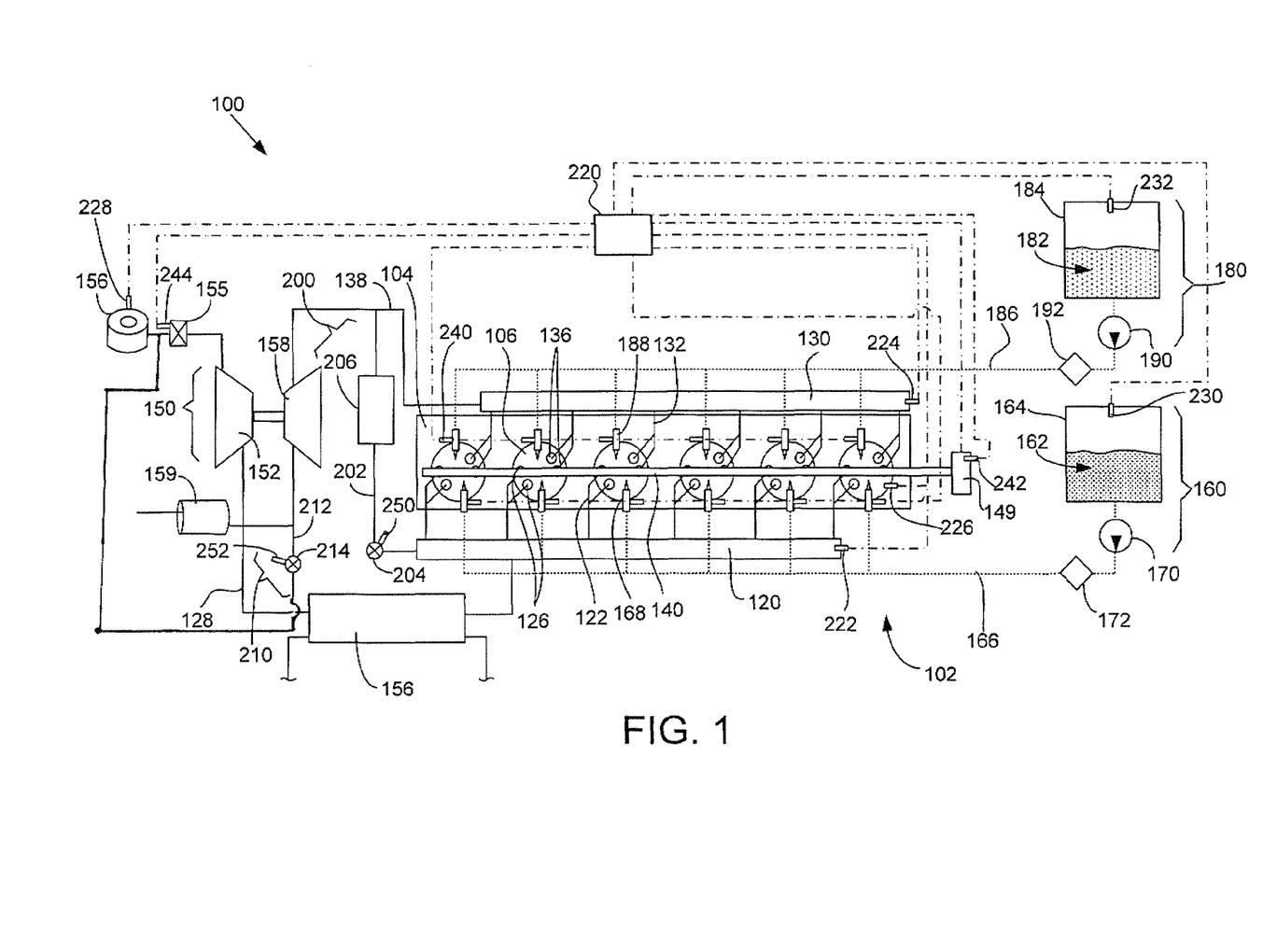
FIG. 1 is a block diagram of an engine system having an internal combustion engine adapted for RCCI operation by burning fuels having different reactivities, which further includes an EGR feature.

Referring to FIG. 1, wherein like reference numbers refer to like elements, a block diagram for an engine system 100 is depicted. The engine system 100 includes an internal combustion engine 102 and, in particular, a compression ignition engine in which an air/fuel mixture is compressed, raising the pressure and temperature to a point at which auto-ignition occurs. In alternative embodiments, depending on the type of fuels used, the engine may be a spark ignition engine. The illustrated internal combustion engine 102 includes an engine block 104 in which a plurality of combustion chambers 106 are disposed. Although six combustion chambers 106 are shown, in other embodiments fewer or more combustion chambers may be arranged in an inline configuration or another configuration such as a V-configuration. Each combustion chamber 106 is configured to perform an intake-compression stroke in which the air/fuel mixture is introduced and compressed to the point of ignition and a combustion-exhaust stroke where the combusting mixture expands in and is eventually expelled from the combustion chamber.

Figure 2:
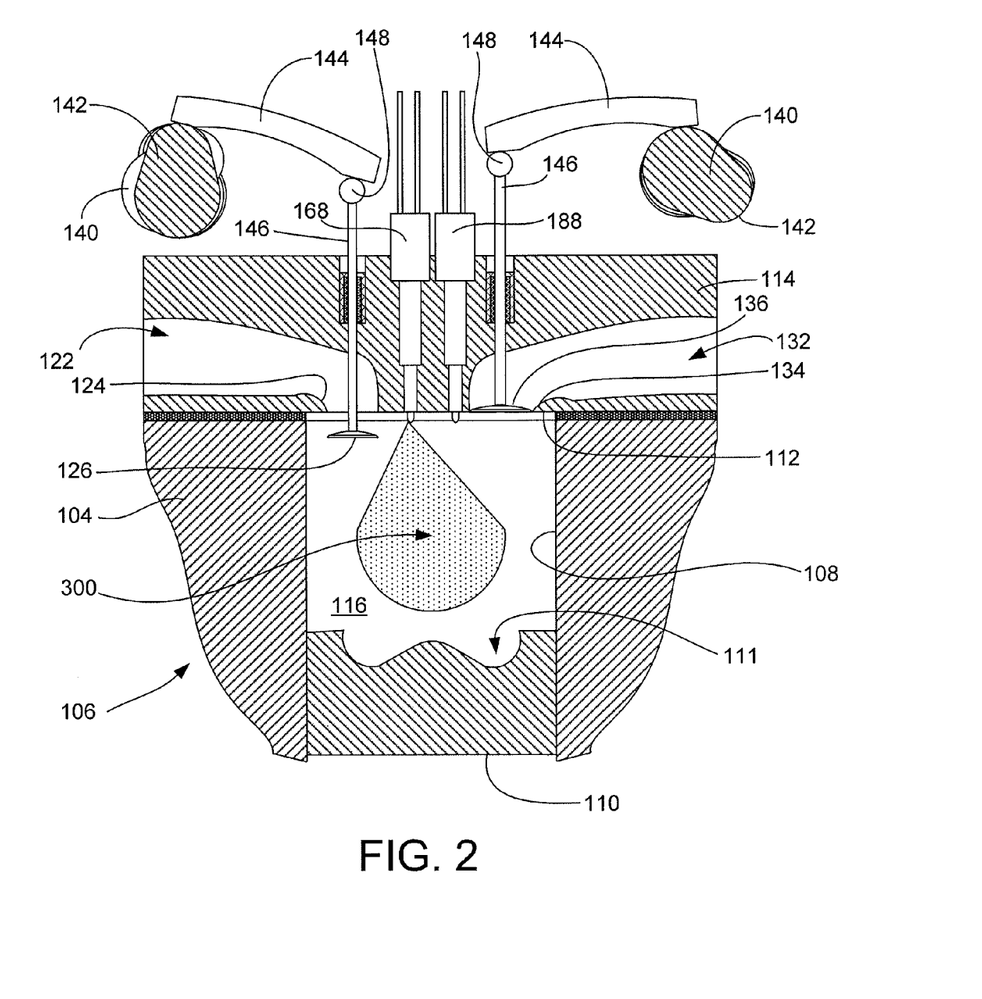
FIG. 2 is a cross-sectional view of an engine cylinder with a movable piston therein that can be disposed in the internal combustion engine and which shows the valves, camshafts, and fuel injectors operating in conjunction with each other.

Referring to FIG. 2, each combustion chamber 106 includes a bore or cylinder 108 that may be bored or formed into the engine block 104 and that can slidably accommodate a movable piston 110 therein. Disposed into the upper face or surface of the piston 110 can be a contoured bowl 111 that can be shaped to channel or direct gas flow within the combustion chamber 106. One end of the cylinder 108 is closed by a flame deck surface 112 disposed along the lowermost surface of a cylinder head 114 that caps the engine block 104. The combustion chamber 106 is therefore generally enclosed by the cylinder 108, the movable piston 110, and the flame deck surface 112. The reciprocal piston 110 moves in the cylinder 108 between a top dead center (TDC) position wherein the piston is closest to the flame deck surface 112 and a bottom dead center (BDC) position where the piston is furthest from the flame deck surface. These motions accomplish the intake-compression and combustion-exhaust strokes described herein. The combustion chamber 106 thereby defines a variable volume 116 that expands and contracts as the piston 110 reciprocates within the cylinder 108 between the TDC position, where the variable volume is at its smallest, and the BDC position, where the variable volume is at its largest. The compression ratio of a typical diesel-burning internal combustion engine may be on the order of 15:1, although other compression ratios are common.

Referring to FIGS. 1 and 2, an intake manifold 120 that extends along each of the combustion chambers 106 and directs the air used in the combustion process can be disposed in or attached to the engine block 104. To establish fluid communication between the intake manifold 120 and the combustion chambers 106, a plurality of intake runners 122 may extend from the intake manifold and, in the illustrated embodiment, may be disposed completely or in part through the cylinder head 114. At least one intake runner 122 is associated with each combustion chamber 106 and terminates at an intake port 124 that may be disposed through the flame deck surface 112 or another portion of the cylinder and that can be selectively opened and closed by an intake valve 126. If the piston 110 is moving in the cylinder 108 from the TDC position downwards to the BDC position while the intake valve 136 is opened, the variable volume 116 will expand to accept therein intake air through the intake port 124 from the intake runner 122. In the illustrated embodiment, the intake port 124 and the intake valve have a generally circular cross section, but in other embodiments could have other suitable shapes and could be formed at locations other than the flame deck surface 112. To receive intake air from the environment and to communicate with the other components of the intake system, the intake manifold 120 can be associated with an intake line 128 disposed through the engine system 100.

To direct the exhaust gasses produced by combustion of the air/fuel mixture from the cylinder 108, an exhaust manifold 130 can be disposed in or attached to the engine block 104 in a manner that functionally mirrors the intake manifold 120. The exhaust manifold 130 can communicate with the combustion chambers 106 by a plurality of exhaust runners 132 that extend from the exhaust manifold and terminate at an exhaust port 134 proximate to the cylinder 108. At least one exhaust runner 132 and one exhaust valve 136 can be associated with each cylinder 108. Similar to the intake system, the exhaust runner 132 and the exhaust port 134 can be disposed in the cylinder head 114 and can be selectively opened and closed by an exhaust valve 136. If the exhaust valve 136 is opened when the piston 110 moves from the BDC position to the TDC position in the cylinder 108, the exhaust gasses therein will be pushed through the exhaust port 134 and into the exhaust manifold 130. To return the exhaust gasses to the atmosphere, the exhaust manifold 130 can be in fluid communication with an associated exhaust line 138 disposed through the engine system 100.

Selective opening and closing of the intake and exhaust valves 126, 136 can be controlled by a rotating camshaft 140 that can be supported over the engine block 104 and that extends generally over the plurality of combustion chambers 106. Referring to FIG. 2, the camshaft 140 can include a plurality of eccentric lobes 142 along its length with each lobe out-of-phase with respect to an adjacent lobe. Protruding vertically from the engine block 104 can be a plurality of valve stems or pushrods 146, each of which is slidably disposed through the cylinder head 114 and connected to an associated intake or exhaust valve 126, 136. A valve bridge 144 extends between the camshaft 140 and a cam follower 148 disposed on the distal end of each of the valve pushrods 146. As the camshaft 140 rotates, the eccentric lobes 142 cause the valve bridge 144 to pivot, which causes the intake valve 126 and exhaust valve 136 to alternately move up and down with respect to the intake port 124 and exhaust port 134. A single camshaft 140 may activate both the intake valve 126 and the exhaust valve 136 as illustrated in FIG. 1 or two dedicated camshafts arranged parallel to each other may be separately associated with the intake valves and exhaust valves respectively as illustrated in FIG. 2. In certain engine applications, the arrangement of the eccentric lobes 142 along the camshaft 140, the speed of rotation of the camshaft, and/or the location of the camshaft relative to the valves can be selectively adjusted to thereby alter the timing of the valve openings and closings in a process that is commonly referred to as variable valve timing. As is known, other methods exist for implementing variable valve timing such as additional actuators acting on the valve stems and the like. Referring back to FIG. 1, rotation of the camshaft 140, and thus timing of the intake valve openings and closings, can be controlled by a camshaft actuator 149.

To assist in directing the intake air to and exhaust gasses from the internal combustion engine 102, the engine system 100 can include a turbocharger 150. The turbocharger 150 includes a compressor 152 disposed in the intake line 128 that compresses intake air drawn from the atmosphere through an air filter 154 and directs the compressed air to the intake manifold 120. Although a single turbocharger 150 is shown, more than one such device connected in series and/or in parallel with another can be used. The air filter 154 can serve to filter particulates, moisture, and pollution from air drawn from the atmosphere. In some embodiments, to control or govern the amount of air drawn into the engine system 100, and thus potentially adjust the amount of exhaust gas that is recirculated in the engine, an adjustable governor or intake throttle 155 can be disposed in the intake line 128 between the air filter 154 and the compressor 152. Because the intake air may become heated during compression, an intercooler 156 can be disposed in the intake line 128 between the compressor 152 and the intake manifold 120 to cool the compressed air. To power the compressor 152, a turbine 158 can be disposed in the exhaust line 138 and can receive pressurized exhaust gasses being expelled from the combustion chambers 106 through the exhaust manifold 130. The pressurized exhaust gasses directed through the turbine 158 can rotate a series of blades therein which are rotatably coupled to a series of blades in the compressor. One or more exhaust after-treatment devices 159 may be disposed in the exhaust line 138 downstream of the turbine 158 to further treat the exhaust gasses before they are expelled to the atmosphere.

To provide fuel of two different reactivities for the RCCI combustion process, the engine system 100 can be equipped with a first fuel system 160 configured to deliver fuel 162 of a first reactivity and a second fuel system 180 configured to deliver fuel 182 of a second reactivity. In an embodiment, the first fuel 162 can have a lower reactivity than the second fuel 182, for example, the first fuel can be gasoline and the second fuel can be diesel. Reactivity generally refers to the readiness of the fuel to combust upon compression ignition, with higher reactivity fuels typically igniting more quickly than lower reactivity fuels. Reactivity can be related to the cetane number of the fuel that is a measure of the speed at which a fuel starts to auto-ignite under compression. Common diesel fuels may have a cetane number from about 40 to about 55 while common gasoline may have a research octane number of 90-100 RON, where the octane rating may be considered the opposite of cetane as the resistance to a fuel auto-igniting. The practical effect is that gasoline is typically less reactive than diesel. The rating numbers may vary though depending upon additives, conditioning, etc.

The first and second fuels 162, 182 can be stored and supplied to the internal combustion engine 102 separately. To store the first fuel 162, for example, gasoline, the first fuel system 160 can include a first fuel tank or reservoir 164 that may be periodically replenished. To direct the first fuel 162 to the internal combustion engine 102, the first fuel system 160 can include a first fuel line 166 that is in fluid communication with a plurality of electrically actuated first fuel injectors 168 that are associated with each combustion chamber 106. To pressurize the first fuel 162 and force it to flow through the first fuel line 166, a first fuel pump 170 can be disposed in the first fuel line between the first fuel reservoir 164 and the first fuel injectors 168. Also disposed in the first fuel line 166 can be a first filter or first conditioning module 172 for filtering or conditioning the first fuel 162. Similarly, the second fuel system 180 can include a second fuel reservoir 184 for storing the second fuel 182. The second fuel reservoir 184 can communicate with a plurality of second electrically actuated fuel injectors 188 that are associated with the combustion chambers 106 via a second fuel line 186 disposed through the engine system 100. The second fuel line 186 can also include a second fuel pump 190 for pressurizing the second fuel and a second fuel module 192 for filtering or conditioning the second fuel. In the illustrated embodiment, the first and second fuel injectors 168, 188 can be dedicated to separately introducing fuels of different reactivities. However, in other embodiments, a single, common fuel injector can be utilized to introduce fuels of different reactivities. Also, in other embodiments, introduction methods other than a fuel injector, such as a carburetor or the like, can be utilized.

In addition to or instead of the two-fuel embodiment, the engine system 100 can be configured to operate using a single fuel from a single fuel source whose reactivity is modified. Fuel reactivity can be modified by additives such as cetane enhancers or the like that can be mixed with a portion of the first fuel to create a second fuel of a second, higher reactivity. Additionally, the reactivity of the first fuel can be modified by catalytic convertors, permeable membrane separation, fuel reactors and the like.

As indicated above, the engine system 100 can also include an exhaust gas recirculation ("EGR") system that operates to utilize exhaust gas from the engine's exhaust system and mix it with intake air to displace oxygen and generally lower combustion temperatures during the combustion process. The EGR system forms an intake air/exhaust gas mixture that is introduced to the combustion chambers before or as the fuel is added. Two exemplary EGR systems are shown associated with the engine system 100 in FIG. 1, but it should be appreciated that these illustrations are exemplary and that either one, both, or neither can be used on the engine. It is contemplated that selection of an EGR system of a particular type may depend on the particular requirements of each engine application.

In the first embodiment, a high-pressure EGR system 200 operates to direct high-pressure exhaust gasses to the intake manifold 120 communicating with the intake runners 122. The high-pressure EGR system includes a high-pressure EGR line 202 that communicates with the exhaust line 138 downstream of the exhaust manifold 130 and upstream of the turbine 158 to receive the high-pressure exhaust gasses being expelled from the combustion chambers 106. The system is thus referred to as a high-pressure EGR system 200 because the exhaust gasses received have yet to depressurize through the turbine 158. The high-pressure EGR line 202 is also in fluid communication with the intake manifold 120. To control the amount or quantity of the exhaust gasses combined with the intake air, the high-pressure EGR system 200 can include an adjustable EGR valve 204 disposed along the high-pressure EGR line 202. Hence, the ratio of exhaust gasses mixed with intake air can be varied during operation by adjustment of the adjustable EGR valve 204. Because the exhaust gasses may be at a sufficiently high temperature that may affect the combustion process, the high-pressure EGR system can also include an EGR cooler 206 disposed along the high-pressure EGR line 202 to cool the exhaust gasses.

In the second embodiment, a low-pressure EGR system 210 directs low-pressure exhaust gasses to the intake line 128 before it reaches the intake manifold 120. The low-pressure EGR system 210 includes a low-pressure EGR line 212 that communicates with the exhaust line 138 downstream of the turbine 158 so that it receives low-pressure exhaust gasses that have depressurized through the turbine. The system is thus referred to as a low-pressure EGR system because it operates using depressurized exhaust gasses. To control the quantity of exhaust gasses diverted, the low-pressure EGR line 212 may also include an adjustable EGR valve 214. The low-pressure EGR line 212 may communicate with the intake line 128 upstream of the intercooler 156 so that the exhaust gasses may be cooled before entering the combustion chambers 106.

To coordinate and control the various systems and components associated with the engine system 100, the system can include an electronic or computerized control unit, module or controller 220. The controller 220 is adapted to monitor various operation parameters and to responsively regulate various variables affecting engine operation. The controller 220 can include a microprocessor, an application specific integrated circuit (ASIC), or other appropriate circuitry and can have memory or other data storage capabilities. Although in FIG. 1 the controller 220 is illustrated as a single, discrete unit, in other embodiments, the controller and its functions may be distributed among a plurality of distinct and separate components. To receive operating parameters and send control commands, the controller can be operatively associated with and can communicate with various sensors and controls on the engine system 100. Communication between the controller and the sensors can be established by sending and receiving digital or analog signals across electronic communication lines or communication busses. The various communication and command channels are indicated in dashed lines for illustration purposes.

For example, to monitor the pressure and/or temperature in the intake manifold 120, the controller 220 can communicate with an intake manifold sensor 222 such as a transducer or other electronic device that is disposed in the intake manifold and that can sense or measure the conditions therein. To monitor the conditions such as pressure and/or temperature in the exhaust manifold 130, the controller 220 can similarly communicate with an exhaust manifold sensor 224 disposed in the exhaust manifold 130. From the temperature of the exhaust gasses in the exhaust manifold 130, the controller 220 may be able to infer the temperature at which combustion in the combustion chambers 106 is occurring. To more specifically monitor conditions in the combustion chambers 106, the controller 220 may communicate with chamber sensors 226, one of which may be associated with each cylinder 108 in the engine block 104. The chamber sensors 226 can monitor the combustion chamber conditions directly or indirectly. For example, by measuring the backpressure exerted against the intake or exhaust valves, or other components that directly or indirectly communicate with the combustion cylinder such as glow plugs, during combustion, the chamber sensors 226 and the controller 220 can indirectly measure the pressure in the cylinder 108. To measure the quality, quantity and/or temperature of the intake air, the controller 220 can also communicate with an intake air sensor 228 that may be associated with, as shown, the intake air filter 154 or another intake system component such as the intake manifold.

To determine the first reactivity of the first fuel 162, the controller 220 can communicate with a first reservoir sensor 230 disposed in or associated with the first fuel reservoir 164 and that can sense, for example, the cetane number of the first fuel. Likewise, the controller 220 can communicate with a second reservoir sensor 232 associated with the second fuel reservoir 184 to determine the second reactivity of the second fuel 182. Additionally, the controller 220 can determine the relative reactivity or difference between the first and second fuels 162, 182 by subtraction. In one embodiment, determination of the difference in reactivity between the first and second fuels may be determined in real time based on combustion characteristics such as ignition timing, duration, heat release rate and others based on information provided by the chamber sensors 226.

To further control the combustion process, the controller 220 can communicate with injector controls 240 that may be operatively associated with each of the first fuel injectors 168 and the second fuel injectors 188. The injector controls 240 can determine the timing of introduction and the quantity of fuel introduced by each fuel injector 168, 188. Additionally, the injector controls 240 can determine the relative or corresponding quantities of the first and second fuels 162, 182 and thus control the actual quantitative difference in reactivity in the combustion chambers 106. To further control the timing of the combustion operation, the controller 220 can also communicate with a camshaft control 242 that is operatively associated with the camshaft 140. By managing the speed and rotation of the camshaft 140, the controller 220 can control which valves are open and for how long, thereby controlling the quantity of intake air into and exhaust gasses out of the combustion chambers 106. The camshaft control 242 can also determine the engine speed by, for example, measuring the rotational speed of the camshaft 140 that is representative of the speed of the crankshaft and translating pistons in the combustion chamber 106. In those embodiments having an intake throttle 155, the controller 220 can communicate with a throttle control 244 associated with the throttle and that can control the amount of air drawn into the engine system 100.

The controller 220 can also be operatively associated with either or both of the high-pressure EGR system 200 and the low-pressure EGR system 210. To accomplish this, the controller 220 is communicatively linked to a high-pressure EGR control 250 associated with the adjustable EGR valve 204 disposed in the high-pressure EGR line 202. Similarly, the controller 220 can also be communicatively linked to a low-pressure EGR control 252 associated with the adjustable EGR valve 214 in the low-pressure EGR line 212. The controller 220 may be further associated with other flow and/or pressure sensors disposed in the intake and/or exhaust system for measuring the amount of exhaust gas being recirculated such that the amount can be controlled by appropriate adjustments of the respective EGR valves. The controller can thereby adjust the amount of exhaust gas used with the two-fuel combustion process and thus can determine the intake air/exhaust gas ratio the engine system is operating on.

Referring to FIGS. 2-5, there is illustrated an exemplary series of events or stages of an intake-compression stroke of an engine configured to combust fuels having two different reactivities in, for example, an RCCI process. Starting with FIG. 2, during the intake stroke when the piston 110 moves from the TDC position toward the BDC position, the intake valve 126 is opened so that intake air can enter the expanding variable volume 116 through the intake port 124. Additionally, an initial fuel charge of a lower reactivity is introduced to the variable volume 116. This can be accomplished by injecting a plume 300 of the first fuel, e.g., gasoline, through the first fuel injector 168. This can occur during the intake stroke or just after the piston 110 reaches the BDC position so that the first plume 300 has time to homogenously mix with the intake air/exhaust gas mixture and disperse uniformly through the variable volume 116. In an alternative embodiment, the first fuel can be mixed with the intake air as the intake air enters the intake port.

Figure 3:
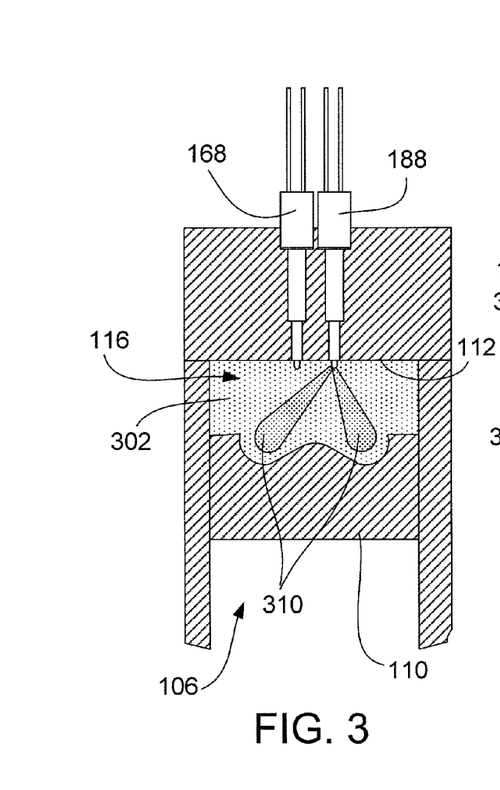
FIGS. 3-5 are cross-sectional views of the engine cylinder and the piston movably disposed therein at various points during a compression cycle during which stratified regions of different reactivities are formed within the cylinder.

Referring to FIG. 3, an air/fuel mixture 302 formed from the intake air and the first fuel is compressed during the early compression stroke as the piston 110 begins to move from the BDC position toward the TDC position proximate the flame deck surface 112. During compression, the pressure and the temperature in the combustion chamber will begin to rise. At this time, the second fuel that may have a higher reactivity, e.g., diesel, can be introduced to the variable volume by injection through the second fuel injector 188. The second fuel plume 310 can be injected at any time between the BDC position of the piston 110 (180 degrees of crankshaft rotation before TDC) and 10 degrees before the TDC position (0 degree position). The controller can determine the timing of the second introduction during the compression stroke using the fuel injector controls.

Figure 4:
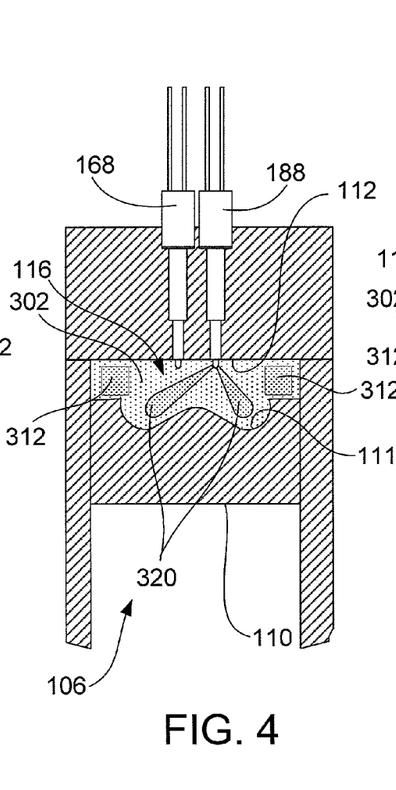

Referring to FIG. 4, if the timing of the introduction of the second fuel plume occurs sufficiently early during the compression stroke, the second fuel may form first regions 312 of higher reactivity within the mixture 302 that may migrate or progress toward the outer periphery of the variable volume 116. If the piston 110 has a bowl 111 with an associated upward directed, outermost rim, the first regions 312 may become compressed or "squished" between the piston and the flame deck surface 112 at the outer periphery of the variable volume 116. At this stage, another introduction of higher reactivity fuel can be accomplished by injecting a third plume 320 into the variable volume 116. The third plume 320 can include the higher reactivity second fuel, such as diesel, or in other embodiments, it can be obtained from a different source having a different reactivity than either the first or second fuels. The third plume 320 might be relatively more centralized within the variable volume 116 and it might be generally directed toward the bowl 111 of the piston 110.

Figure 5:
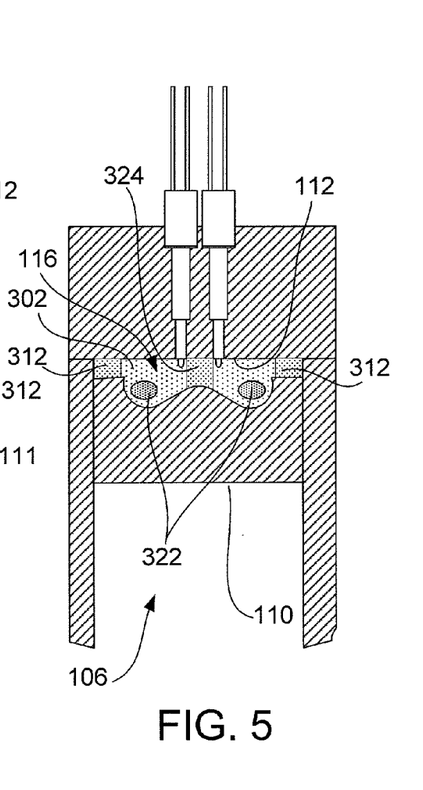

At the time the piston 110 reaches the TDC position, shown in FIG. 5, the higher reactivity fuel introduced by the third plumes may have formed second regions 322 of higher reactivity that are located intermediately between the outer periphery and the center of the variable volume 116 and that may be proximately located within the bowl 111 of the piston 110. Additionally, there may be a third region 324 of higher reactivity fuel formed generally at the center of the variable volume 116 resulting from the diffuse fuel remaining proximate to the second fuel injector 188 after the third injection event. The first regions 312 may remain located at the outer periphery squished between the piston 110 and the flame deck surface 112 but, over time, may have diffused so that they have an intermediate reactivity compared to the mixture 302 and the second and third regions 322, 324.

Thus, at TDC just before combustion, the variable volume includes a plurality of regions of different reactivities that are stratified relative to each other. These regions include: (1) the mixture 302 of relatively low reactivity generally dispersed throughout the variable volume 116; (2) the first regions 312 of intermediate reactivity at the outer periphery; and (3) the second and third regions 322, 324 of higher reactivity that are generally centrally located. At the time the piston 110 reaches TDC, compression of the variable volume 116 and the associated pressure and temperature rise may reach a point where the contents of the variable volume auto-ignite. Combustion may initiate or begin in the second and third regions 322, 324 of higher reactivity and propagate to the first regions 312 of intermediate reactivity then through the mixture 302 dispersed through the variable volume 116. As indicated above, the difference in reactivity and the relative arrangement of the regions of different reactivity determines the actual time at which the regions of higher reactivity auto-ignite and/or the combustion rate or speed at which the flame propagates through the variable volume, and as a result the peak flame temperature.

Referring back to FIG. 1, the controller 220 can determine the actual combustion process performance and engine operating parameters through the sensors and controls. For example, ignition timing and combustion rate are two factors determined in part by the relative reactivities and stratification between the two fuels and that affect other engine operating parameters. The ignition timing can be determined based on one of several engine operating parameters such as cylinder pressure, cylinder temperature or crankshaft rotation which can be determined using the chamber sensor 226 and/or the camshaft controller 242. The actual combustion rate can be determined using the relative reactivities and the quantities of the first and second fuels that, in turn, are known or determined from the first and second reservoir sensors 230, 232 and the fuel injector controls 240. The theoretical combustion rate for various relative reactivity conditions in the variable volume can be calculated theoretically or determined empirically and that data can be stored in the controller 220. Using the measured parameters and the theoretical data, the controller 220 can estimate the actual combustion rate or other operating conditions in the combustion chambers 106.

Further, because the ignition timing and combustion rate are determined in part by the relative reactivity ratios and reactivity stratification, the controller 220 can further control and adjust the combustion process by varying the relative reactivity ratio or reactivity stratification in the various regions within the combustion cylinders. This can be accomplished in any suitable way including, for example: (1) changing the relative quantities or amounts introduced of the first fuel having the first reactivity with respect to the second fuel of the second reactivity; (2) changing the timing of introduction of the first fuel with the first reactivity and/or the second fuel having the second reactivity In particular, the timing of the second and any subsequent introductions can determine the reactivity gradient or physical matrix of the different reactivity regions within the combustion chamber.

Additionally, because EGR affects many of the same combustion processes and operating variables as RCCI, the controller 220 can be configured to balance or correlate the two processes to improve engine performance. For example, the timing and quantity of the introduction of the second fuel of the second reactivity can be correlated with the EGR rate such that an adjustment or change in one results in an adjustment or change in the other. Controlled adjustment of the EGR ratio can change the oxygen content of the various regions of different reactivity within the combustion chamber in a manner that can affect ignition timing and combustion rate. In particular, the intake air/exhaust gas ratio can be adjusted by: (1) introducing more exhaust gas or (2) introducing more intake air via the intake throttle. As another example, the following control matrix can be developed from the following principles: (1) combustion rate varies inversely with EGR, e.g., increased EGR lowers combustion rate and decreased EGR increases combustion rate; (2) combustion rate varies with reactivity stratification, e.g., increased stratification lowers combustion rate and decreased stratification increase combustion rate.

TABLE 1

| Desire Outcome | Control 1 | Control 2 |
| --- | --- | --- |
| Increase Combustion Rate | Lower EGR | Lower Reactivity Stratification |
| Decrease Combustion Rate | Increase EGR | Increase Reactivity Stratification |

The RCCI combustion process and the EGR system advantageously provide the controller 220 with two different modes or methodologies for controlling engine operation and adjusting performance. Moreover, the controller can select the more appropriate control based on prevailing conditions such as environmental conditions, difference or variation in the reactivities of the first and second fuels, etc.

Industrial Applicability

Figure 6:
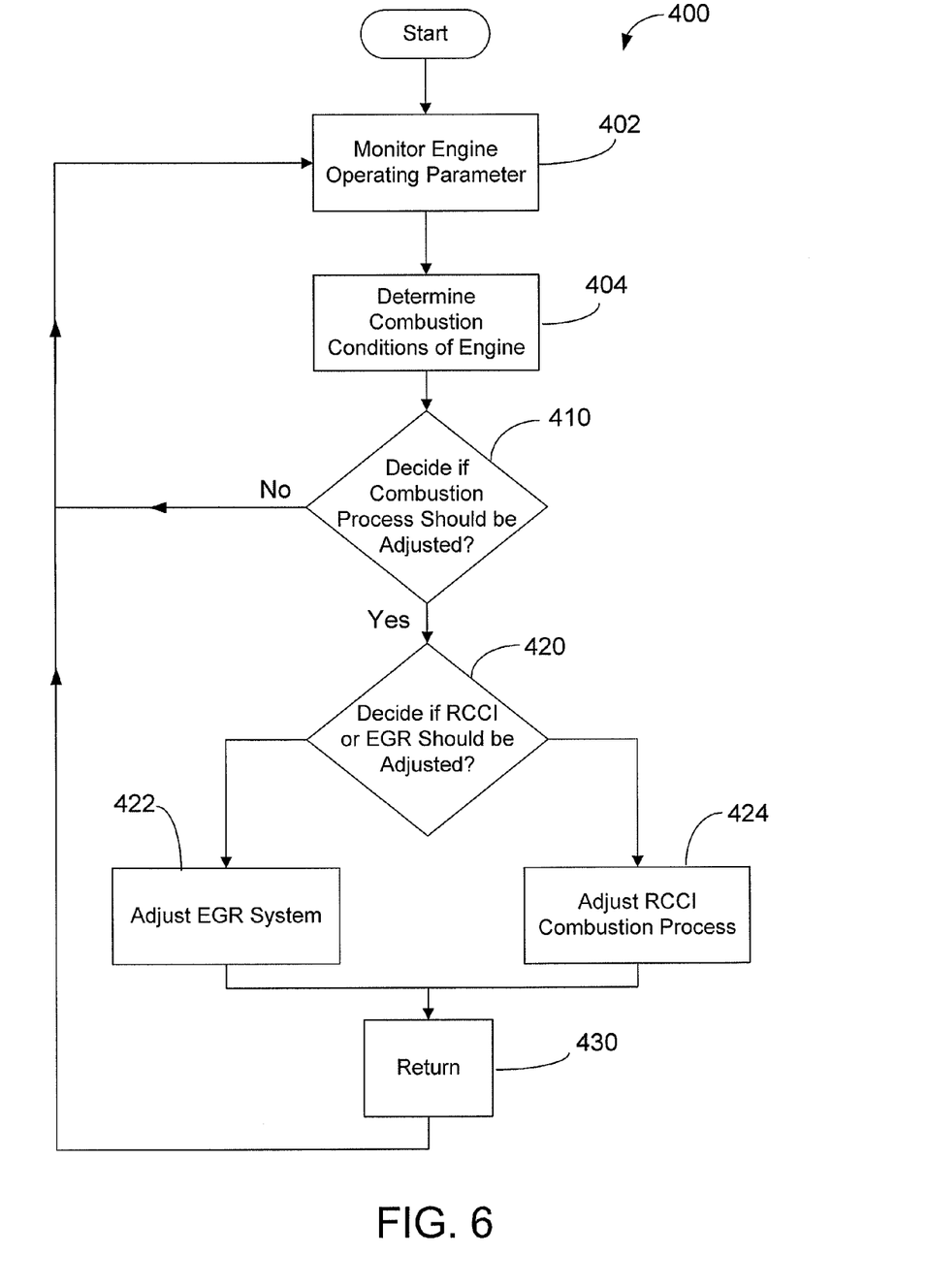
FIG. 6 is a schematic flow chart representing a possible routine or steps for operating the engine system using both the RCCI combustion process and the EGR feature.

The present disclosure is applicable to internal combustion engines and, more particularly, to compression ignition engines operating with more than one fuel using an RCCI combustion process with EGR. Referring to FIG. 6, there is illustrated a flowchart of an internal control system 400 that can be performed by an electronic controller and used with an engine system using both RCCI combustion and EGR. In the first monitoring step 402, the controller measures at least one operating parameter reflective of the dual reactivity combustion process occurring in the combustion chambers. The operating parameter can be, for example, combustion chamber pressure, combustion chamber temperature or engine speed. In a subsequent or ongoing determination step 404, the controller uses the measured operating parameter and possibly other information to assess various combustion conditions such as ignition timing or combustion rate. In a first decision step 410, the controller can decide based on the previously determined conditions whether an adjustment to the combustion process should be made to improve engine operation. For example, it may be appropriate to attempt to reduce engine emissions such as $NO_X$ or to increase thermal efficiency, where thermal efficiency is a measure of the conversion efficiency of fuel to utilized power as opposed to heat or entropy losses. If no adjustment is required, the control system may just return to the monitoring step 402.

If the controller determines there is a need for adjustment, then another decision step 420 can determine if either the RCCI system should be adjusted or the EGR system should be adjusted, or a combination of both. For example, because of specific operating conditions or environmental concerns, it may be preferable to adjust the EGR system rather than adjust the relative reactivity ratio or reactivity stratification and vice versa. This decision can be made based on known correlations of RCCI and EGR, which are embodied at data tables stored in an electronic controller. If it is determined to adjust the EGR system, in a subsequent first instruction step 422 the controller can issue an appropriate instruction or command to the EGR valve to increase or decrease the quantity of exhaust gasses introduced to the intake air. If it is determined to adjust the reactivity, in a second instruction step 424 the controller can send an appropriate command to the fuel injectors to adjust the relative reactivities or the timing of the fuel introductions to the combustion chambers. In a subsequent return step 430, the control system 400 can return the monitoring step 402 to determine and assess the effect of the adjustments. It will be appreciated that the control system can be run continuously to provide a closed looped feedback system for continuously adjusting operation of the engine system.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

I claim:

1. An internal combustion engine system comprising:
 a combustion chamber defining a variable volume, the combustion chamber delineated by a cylinder and a piston moving in the cylinder;
 an intake system directing intake air to the combustion chamber;
 an exhaust system directing exhaust gasses from the combustion chamber;
 an exhaust gas recirculation system (EGR) system for directing a portion of the exhaust gasses from the exhaust system to the intake system;
 a first fuel injector for introducing a first fuel charge having a first reactivity at a first time;
 a second fuel injector for introducing a second fuel charge having a second reactivity at a second time;
 a sensor monitoring an engine operating parameter; and
 a controller communicating with the sensor, the controller further controlling the EGR system and the second fuel injector, the controller configured to select from and adjust in a correlated manner the EGR system and the second injector in part upon the operating parameter.

2. The system of claim 1, wherein the first fuel injector and the second fuel injector introduce the first fuel charge and second fuel charge respectively directly into the combustion chamber.

3. The system of claim 2, wherein the first fuel injector introduces the first fuel charge at the first time such that the first fuel charge mixes with the intake air in the combustion chamber and, wherein the second fuel injector introduces the second fuel charge at the second time such that the second fuel charge forms stratified regions in the combustion chamber.

4. The system of claim 3, wherein the controller adjusts the second time of the second fuel charge.

5. The system of claim 4, wherein the engine operating parameter is selected from the group consisting of combustion chamber pressure, combustion chamber temperature, and crankshaft rotation.

6. The system of claim 5, wherein the controller is configured to determine a combustion rate of the first fuel charge and the second fuel charge in the combustion chamber.

7. The system of claim 6, wherein the EGR system is selected from the group consisting of a low-pressure EGR system and a high-pressure EGR system.

8. The system of claim 1, further comprising a first fuel reservoir for storing a first fuel for the first fuel charge and a second fuel reservoir for storing a second fuel for the second fuel charge.

9. The system of claim 8, wherein the first fuel is gasoline and the second fuel is diesel.

10. A method of operating an internal combustion engine configured to utilize fuels having two different reactivities, the method comprising:
 mixing via an exhaust gas recirculation (EGR) system a portion of exhaust gasses with intake air to provide an intake air/exhaust gas mixture;

introducing in a combustion chamber the intake air/exhaust gas mixture;

introducing into the combustion chamber a first fuel charge of a first reactivity at a first introduction time during a intake-compression cycle;

subsequently introducing into the combustion chamber a second fuel charge of a second reactivity at a second introduction time during the intake-compression cycle;

combusting the first and second fuel charges in the combustion chamber in response to the second introducing step;

monitoring at least one engine operating parameter reflective of the combusting of the first and second fuel charges; and selecting from and adjusting in a correlated manner the EGR system and the second introducing step.

11. The method of claim 10, wherein the first introducing step occurs during an intake stroke so that the first fuel charge disperses generally uniformly in the combustion chamber.

12. The method of claim 11, wherein the second introducing step occurs during a compression stroke do that the second fuel charge forms stratified regions in the combustion chamber.

13. The method of claim 10, wherein the step of adjusting changes a ratio of the intake air/exhaust gas mixture.

14. The method of claim 10, wherein the step of adjusting changes the second introduction time of the second fuel charge with respect to the first introduction time of the first fuel charge.

15. The method of claim 10, wherein the operating parameter is selected from the group consisting of combustion chamber pressure, combustion chamber temperature, and crankshaft rotation.

16. The method of claim 10, wherein the step of adjusting causes a combustion rate of combusting the first and second fuel charges to change.

17. The method of claim 10, wherein the EGR system is selected from the group consisting of a high-pressure EGR system and a low-pressure EGR system.

18. A method of adjusting combustion in an internal combustion engine comprising:

mixing intake air with exhaust gasses via an exhaust gas recirculation (EGR) system to produce an intake air/exhaust gas mixture at a mixing ratio;

introducing the intake air/exhaust gas mixture into a combustion chamber during an intake stroke as a piston moves a cylinder of the combustion chamber from a top dead center (TDC) position to a bottom dead center (BDC) position;

introducing an first fuel charge having a first reactivity into a combustion chamber at a first introduction time so that the first fuel charge generally uniformly disperses within the combustion chamber;

subsequently introducing a second fuel charge having a second reactivity into the combustion chamber at a second introduction time so that the second fuel charge forms a stratified region within the combustion chamber;

initiating auto-ignition of the stratified region of the second fuel charge at an ignition time during a compression stroke as the piston moves from the BDC position to the TDC position;

combusting the first fuel charge and the intake air/exhaust gas mixture in the combustion chamber;

determining the ignition time by use of a sensor; and selecting from and adjusting in a correlated manner the mixing ratio and the second introduction time based in part on the determining step.

19. The method of claim 18, wherein the sensor monitors an operating parameter selected from the group consisting of combustion chamber pressure, combustion chamber temperature, and crankshaft rotation.

20. The method of claim 18, wherein the step of adjusting adjusts the mixing ratio of the intake air/exhaust gas mixture.

\* \* \* \* \*

UNITED STATES PATENT AND TRADEMARK OFFICE
CERTIFICATE OF CORRECTION

| | | |
|---|---|---|
| PATENT NO. | : 8,991,358 B2 | Page 1 of 1 |
| APPLICATION NO. | : 13/559812 | |
| DATED | : March 31, 2015 | |
| INVENTOR(S) | : Christopher R. Gehrke | |

It is certified that error appears in the above-identified patent and that said Letters Patent is hereby corrected as shown below:

In the Specification:
Column 11, line 8, delete "Industrial Applicability" and insert -- INDUSTRIAL APPLICABILITY --.

Signed and Sealed this
First Day of March, 2016

Michelle K. Lee
*Director of the United States Patent and Trademark Office*